United States Patent [19]
Drori

[11] Patent Number: 4,572,784
[45] Date of Patent: Feb. 25, 1986

[54] MULTIPLE-DISC FILTERS

[76] Inventor: Mordeki Drori, 89 Zahal St., Kiron, Israel

[21] Appl. No.: 659,674

[22] Filed: Oct. 11, 1984

[30] Foreign Application Priority Data

Oct. 28, 1983 [IL]  Israel ........................................ 70079

[51] Int. Cl.$^4$ ............................................ B01D 25/30
[52] U.S. Cl. ..................... 210/133; 210/135; 210/430; 210/447; 210/451; 210/488
[58] Field of Search .............. 210/111, 117, 133, 135, 210/136, 314, 323.1, 340, 405, 429, 430, 431, 447, 446, 451, 488, 498, 108

[56] References Cited

U.S. PATENT DOCUMENTS

| | | | |
|---|---|---|---|
| 3,647,084 | 3/1972 | Martin | 210/488 |
| 3,789,990 | 2/1974 | Drori | 210/310 |
| 4,026,806 | 5/1977 | Drori | 210/488 |
| 4,271,018 | 6/1981 | Drori | 210/108 |
| 4,278,540 | 7/1981 | Drori | 210/108 |
| 4,295,963 | 10/1981 | Drori | 210/108 |
| 4,517,089 | 5/1985 | Arnaud | 210/488 |

Primary Examiner—Richard V. Fisher
Assistant Examiner—Wanda L. Millard
Attorney, Agent, or Firm—Benjamin J. Barish

[57] ABSTRACT

A multiple-disc type fluid filter is described wherein the housing includes an outer tubular section, and an inner section having two tubular members with an end plate at one end of one tubular member and securable to an open end of the outer housing section. The two tubular members of the inner housing section include ribs for supporting the filter discs. The end plate and the tubular member to which it is secured are open and constitute one of the filter ports, e.g. the inlet port, and the opposite end of the same tubular member is closed and terminates short of the outer housing section. The second tubular member, which is longitudinally spaced from the closed end of the first tubular member, constitutes the other filter port, e.g. outlet port. The stack of filter discs are all of substantially the same uniform thickness, but there are included a plurality of further discs of non-uniform thickness such as to correct the accumulation of non-uniformities in the latter discs.

15 Claims, 8 Drawing Figures

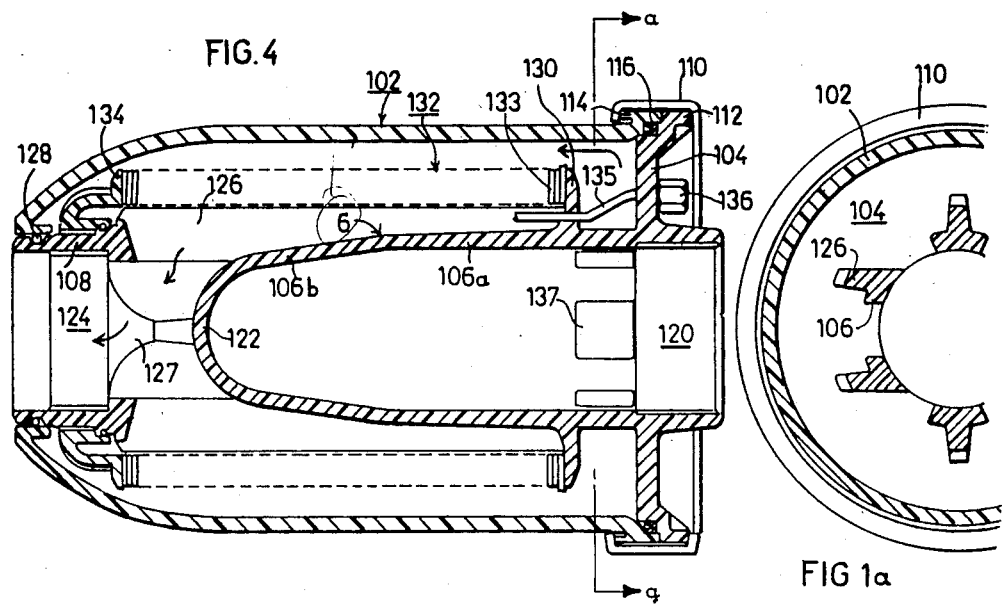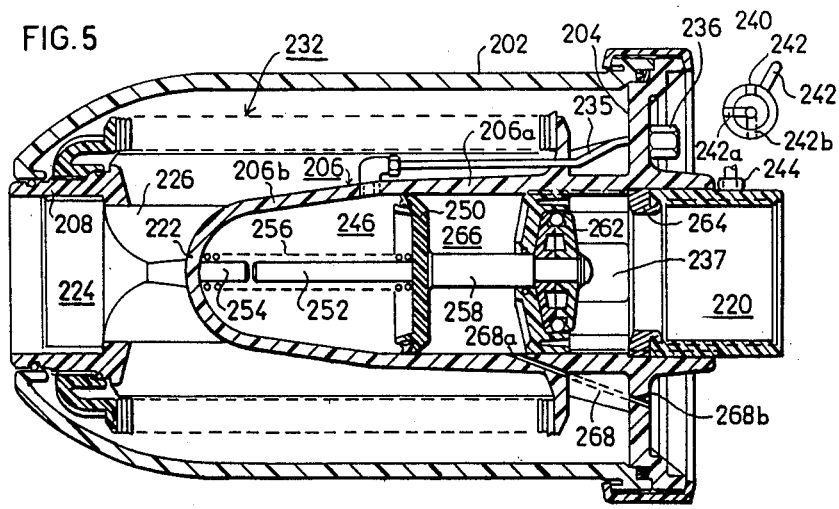

MULTIPLE-DISC FILTERS

BACKGROUND OF THE INVENTION

The present invention relates to filters, and particularly to the multiple-disc type filter such as are now widely used in filtering particles from irrigation water and in many industrial and other applications.

The multiple-disc type filter includes a housing in which the filter body within the housing is in the form of a stack of like, centrally-apertured, filter discs of substantially uniform thickness along their widths and having grooved side faces defining filtering channels between the adjacent discs in the stack. In some applications of such filters, the outer face of the stack of filter discs constitutes the upstream side of the filter, in which case the fluid being filtered passes from the outer face to the inner face of the stack; and in other applications of such filters, the inner face of the stack constitutes the upstream side of the filter, in which case the fluid being filtered passes from the inner to the outer face through the filter stack.

Multiple-disc type filters have a number of advantages over other known types of filters, for example, the cylindrical-screen type filter. Thus, the multiple-disc filter has a larger capacity for removing and retaining dirt particles since the dirt particles may be retained also between the side faces of the discs, in addition to being retained on the upstream surface as in the cylindrical-screen type filter. Another advantage in the multiple-disc filter is that it is not as easily ruptured as the screen type and therefore there is less danger that because of a malfunction, unfiltered water may pass through and clog sprinklers or other devices downstream of the filter. The latter advantage is particularly important in self-cleaning filters wherein the upstream face of the filter is cleaned by a cleaning nozzle which, in the case of a screen-type filter, may rupture the screen by particles becoming wedged between the cleaning nozzle and the filter screen.

However, one of the disadvantages of the multiple-disc type filter is that, although the filter discs are of substantially uniform thickness, there is nevertheless some variation, because of manufacturing tolerances, between the discs, and these variations accumulate in the stack. Thus, a variation of a mere 0.05 mm. in the thickness of one disc, although within a reasonable manufacturing tolerance for an individual disc, becomes problematical when this variation is multiplied by the number of discs, e.g., 150 discs, in the stack. Such thickness variations when multiplied by the number of discs in the stack may result in very significant non-uniformities in spacings between the discs, and therefore non-uniform filter channels. Moreover, since the fluid being filtered seeks the path of least resistance when flowing through the filter body, these non-uniformities in the disc spacings may cause "streaming" therethrough, thereby actually bypassing the filtering channels.

SUMMARY OF THE INVENTION

One object of the present invention is to provide a multiple-disc type filter having advantages in the above respects.

Another object of the present invention is to provide a filter requiring but a few simple parts which can be manufactured and assembled at low cost, and which can also be conveniently disassembled for cleaning purposes. Another object of the invention is to provide a filter which, by the addition or substitution of a few simple parts, can be converted to one having a manual on-off control, automatic shut-off should the filter become overly-clogged, or automatic regulation in response to the outlet pressure.

According to one aspect of the present invention, there is provided a fluid filter including a housing having inlet and outlet ports and a cylindrical filter body extending longitudinally within the housing, characterized in that the housing includes an outer housing section of generally tubular configuration open at both its ends; an inner housing section including first and second longitudinally-extending tubular members and an end plate at one end of the first tubular member and securable to a first open end of the outer housing section; and means on the outer face of the first and second tubular members for supporting the cylindrical filter body; both the end plate and the one end of the first tubular member being open and constituting one of the filter ports; the opposite end of the first tubular member being closed and terminating short of the outer housing section; said second tubular member being open at both ends, with one end longitudinally spaced from the closed end of the first tubular member, and the opposite open end received within the second open end of the outer housing section and constituting the other of the filter ports; a first passageway through the wall of the first tubular member between its closed end and the end plate, establishing communication between the one filter port and the outer face of the filter body; and a second passageway between the closed end of the first tubular member and the adjacent open end of the second tubular member for establishing communication between the outer face of the filter body and the second tubular member constituting the other of the filter ports.

According to another aspect of the present invention, there is provided a filter comprising a housing and a filter body therein including a stack of a plurality of like, centrally-apertured, filter discs of substantially uniform thickness along their widths and having grooved side faces defining filtering channels therebetween, characterized in that the stack of like filter discs include one or more further discs also centrally-apertured but of non-uniform thickness such as to correct the accumulation of non-uniformities in the thickness of the stack of like filter discs.

BRIEF DESCRIPTION OF THE DRAWINGS

The invention is herein described with reference to the accompanying drawings, wherein:

FIG. 4 is a longitudinal sectional view illustrating another form of filter in accordance with the invention; and FIG. 1a is a sectional view along lines a—a thereof; and FIGS. 5, 6, and 7 are longitudinal sectional views illustrating three modifications of the filter of FIG. 4 to incorporate three different types of controls.

DESCRIPTION OF PREFERRED EMBODIMENTS

Figure 1:
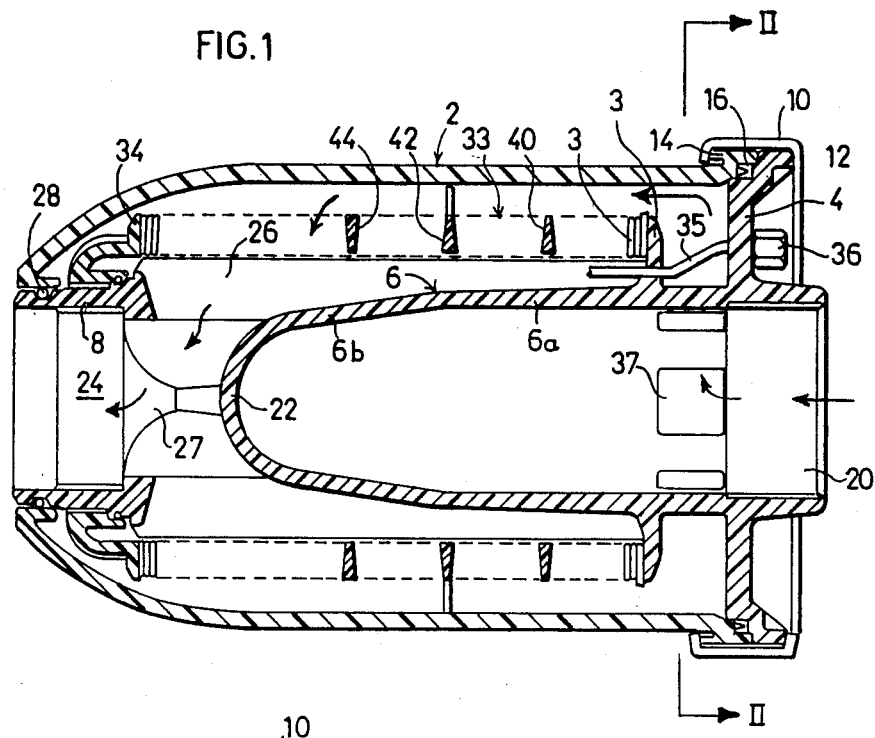
FIG. 1 is a longitudinal sectional view illustrating one form of multiple-disc type filter constructed in accordance with the present invention.
Figure 2:
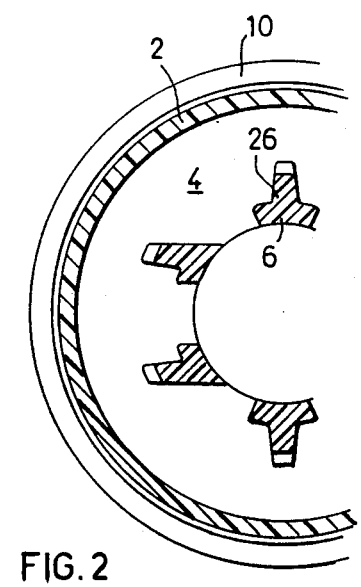
FIG. 2 is a sectional view along lines II—II thereof.
Figure 3:
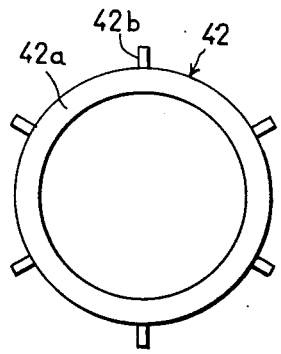
FIG. 3 is an end view of one of the corrective discs in FIG. 1.

The filter illustrated in FIGS. 1–3 of the drawings comprises a housing constituted of an outer cylindrical section 2 open at both ends; and an inner section including an end wall 4, a first tubular member 6, and a second tubular member 8 longitudinally spaced from member 6. End wall 4 is secured to one end of the outer tubular section 2 by means of an outer ring 10 engageable with annular flanges 12 and 14 formed on end wall 4 and housing section 2, respectively, these two members being sealed by an annular sealing ring 16 between them.

End wall 4 of the inner housing section is formed with a central opening 20 constituting the inlet port of the filter, which opening is in alignment with tubular member 6 integrally formed with end wall 4. Tubular member 6 is of substantially uniform diameter, equal to that of the inlet port 20, for most of its length as shown at 6a, but tapers at its rear end 6b and is closed by a curved end wall 22.

Tubular member 8 of the inner housing section is open at both ends and constitutes the outlet port 24 of the filter. Member 8 is integrally joined to tubular member 6 by a plurality of axially-extending, circumferentially-spaced ribs 26 providing passageways 27 between the ribs and leading into the interior of tubular member 8. The latter member is received within a central opening formed in the outer housing section 2 and is sealed therein by means of an annular sealing ring 28 engaging an inwardly extending rim 29 circumscribing the opening in the outer housing section 2.

Tubular member 6 of the inner housing section is formed on its outer face with an annular ring 30 at a location slightly inwardly of end wall 4. Annular ring 30 serves as one end stop for the stack 32 of filter discs 33, applied over the outer edges of the axially-extending ribs 26. The filter discs 33 may be of conventional construction, having central apertures for receiving the ribs 26, and grooved side faces defining filter channels between adjacent discs. These discs are firmly secured in stack form by an end ring 34 threadedly received on the outer face of tubular member 8.

The illustrated filter includes a tube 35 having one end connected to the downstream side of the filter body 32, and the opposite end connected to an outlet tap 36 to provide thereat a pressure corresponding to that at the downstream side of a filter body 32, which is substantially the same as at the outlet port 24 of the filter. This pressure tap 36 may be used to provide an indication of the pressure drop across the filter body, and thereby of the amount of dirt which has accumulated on or within the filter body, to indicate whether or not the filter should be cleaned.

The tubular member 6 is formed with a plurality of openings 37 at its end just inwardly of the end wall 4. Openings 37 constitute a first passageway for the fluid to flow from the filter inlet port 20 to the outer faces of the filter stack 32, which outer faces constitute the upstream surface of the filter stack accumulating the dirt particles separated by the filter. The fluid then passes through the spaces between the filter discs 33 of the stack 32, and from there through the spaces between the radially-extending ribs 26 joining tubular member 6 to tubular member 8, the latter spaces constituting an outlet passageway 27 for the fluid leading to the filter outlet port 24.

It will be appreciated, of course, that port 24 could serve as the inlet port whereupon the inner faces of the filter disc stack 32 would constitute the upstream surface on which the separated dirt particles accumulate, the filtered water then passing through openings 37 and then to port 20 which would then constitute the outlet port for the filter.

As mentioned earlier, the filter discs 33 are all of like construction and are of substantially uniform thickness, but nevertheless, because of manufacturing tolerances, there are variations in their thicknesses which are accumulated by the large number of discs within the stack 32. Thus, such stacks frequently include as many as 150 discs so that small non-uniformities in thicknesses among the discs are so multiplied by the number of discs in the stack that the accumulated variations in disc thickness become very substantial. The non-uniform spacings between the discs thus degrade the filtering action by forming non-uniform filtering channels, as described earlier.

To minimize this disadvantage of multiple-disc filters, the filter illustrated in the drawings includes a plurality of further discs, therein designated 40, 42, and 44, which are provided to correct the accumulation of non-uniformities in the thicknesses of the filter discs 33 of the stack 32. These corrective discs 40, 42, and 44 are not of uniform thickness from their inner to their outer edges, but rather are of varying thicknesses, the thickness preferably changing uniformly from the inner edge to the outer edge of the respective disc. Thus, corrective disc 40 illustrated in FIG. 1 has a thickness which is larger at its inner edge, the thickness uniformly decreasing to its outer edge; whereas corrective disc 44 has a thickness which is smallest at its inner edge and increases uniformly to its outer edge.

Preferably, the assembler or user would be provided with a large number of these corrective discs (e.g. 40, 44), of varying thicknesses, some being thicker at their inner edges and uniformly decreasing to their outer edges as illustrated by disc 40, and others being thinnest at their inner edges and increasing in thickness uniformly to their outer edges as illustrated by disc 44. The user or assembler would insert the appropriate discs at the appropriate locations in the stack in order to correct for any accumulation of non-uniformities in the individual filter discs 33 of the stack.

It will be noted that disc 42, which is more particularly illustrated in FIG. 3, is of a slightly different construction than the other correction discs 40 a designated 42a in FIG. 3, which portion varies in thickness from its inner to its outer edge as discs 40a and 44. Thus disc 42 includes not only the main disc portion and 44 described above, but also include a plurality of ribs or arms 42b extending from its outer face in a radial direction such as to engage the inner face of the outer housing section 2. Thus, when one or more of such correction discs 42 are included within the filter stack 32, their radial arms 42b engaging the inner faces of the outer housing section 2 provide additional mechanical support for the housing, thereby enabling the housing to be constructed of less expensive material.

It will be appreciated that the radial arms 42b could be provided on only one of the correction discs 42, as shown in FIG. 1, in which case the respective correction disc would preferably be located centrally of the filter stack in order to support the midportion of the outer housing section 2; on the other hand, the filter stack could include a plurality of such correction discs having the radially-extending arms 42b so as to provide support at a plurality of locations along the length of the outer housing section 2.

The filter illustrated in FIG. 4 is of the same general construction as that of FIGS. 1–3. It also comprises a housing constituted of two main sections, namely an outer cylindrical section 102 open at both ends; and an inner tubular member 106, and a second tubular member 108 longitudinally spaced from member 106. End wall 104 is secured to one end of the outer tubular section 102 by means of an outer ring 110 engageable with annular flanges 112 and 114 formed on end wall 104 and housing section 102, respectively, these two members being sealed by an annular sealing ring 116 between them.

End wall 104 of the inner housing section is formed with a central opening 120 constituting the inlet port of the filter, which opening is in alignment with tubular member 106 integrally formed with end wall 104. Tubular member 106 is of substantially uniform diameter, equal to that of the inlet port 120, for most of its length as shown at 106a but tapers at its rear end 106b and is closed by a curved end wall 122.

Tubular member 108 of the inner housing section is open at both ends and constitutes the outlet port 124 of the filter. Member 108 is integrally joined to tubular member 106 by a plurality of axially-extending, circumferentially-spaced ribs 126 providing passageways 127 between the ribs and leading into the interior of tubular member 108. The latter member is received within a central opening formed in the outer housing section 102 and is sealed therein by means of an annular sealing ring 128 engaging an inwardly extending rim 129 circumscribing the opening in the outer housing section 102.

Tubular member 106 of the inner housing section is formed on its outer face with an annular ring 130 at a location slightly inwardly of end wall 104. Annular ring 130 serves as one end stop for the stack 132 of filter discs 133, applied over the outer edges of the axially-extending ribs 126. The filter discs 133 may be of conventional construction, having central apertures for receiving the ribs 126, and grooved side faces defining filter channels between adjacent discs. These discs are firmly secured in stack form by an end ring 134 threadedly received on the outer face of tubular member 108.

The illustrated filter includes a tube 135 having one end connected to the downstream side of the filter body 132, and the opposite end connected to an outlet tap 136 to provide thereat a pressure corresponding to that at the downstream side of a filter body 132, which is substantially the same as at the outlet port 124 of the filter. This pressure tap 136 may be used to provide an indication of the pressure drop across the filter body, and thereby of the amount of dirt which has accumulated on or within the filter body, to indicate whether or not the filter should be cleaned.

The tubular member 106 is formed with a plurality of openings 137 at its end just inwardly of the end wall 4. Openings 137 constitute a first passageway for the fluid to flow from the filter inlet port 120 to the outer faces of the filter stack 132, which outer faces constitute the upstream surface of the filter stack accumulating the dirt particles separated by the filter. The fluid then passes through the spaces between the filter discs 133 of the stack 132, and from there through the spaces between the radially-extending ribs 126 joining tubular member 106 to tubular member 108, the latter spaces constituting an outlet passageway 127 for the fluid leading to the filter outlet port 124.

It will be appreciated, of course, that port 124 could serve as the inlet port whereupon the inner face of the filter disc stack 132 would constitute the upstream surface on which the separated dirt particles accumulate, the filtered water then passing through openings 137 and then to port 120 which would then constitute the outlet port for the filter.

It will thus be seen that the filter of FIG. 1 is constructed of a few simple parts which can be produced and assembled in volume and at low cost, and which can be conveniently opened for cleaning purposes.

Figure 6:
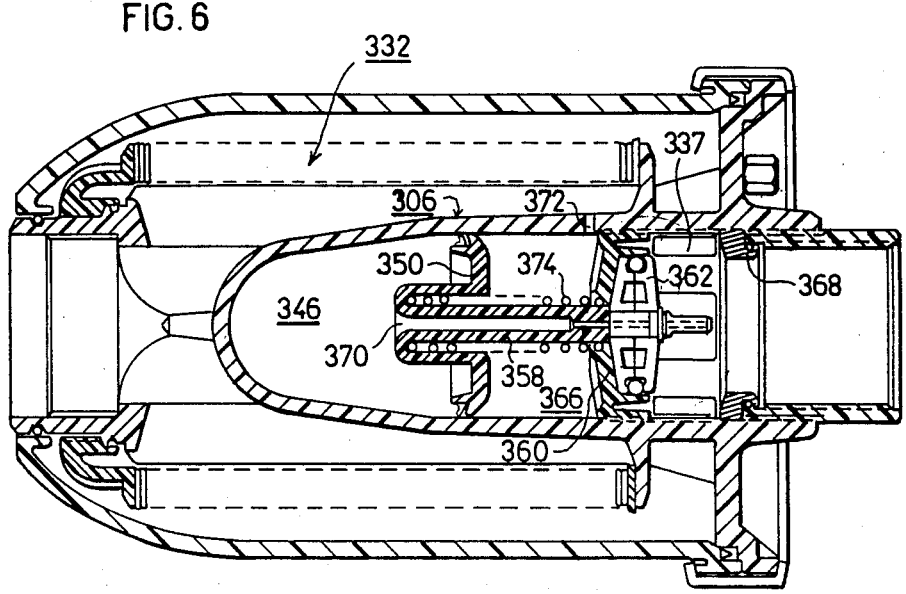
Figure 7:
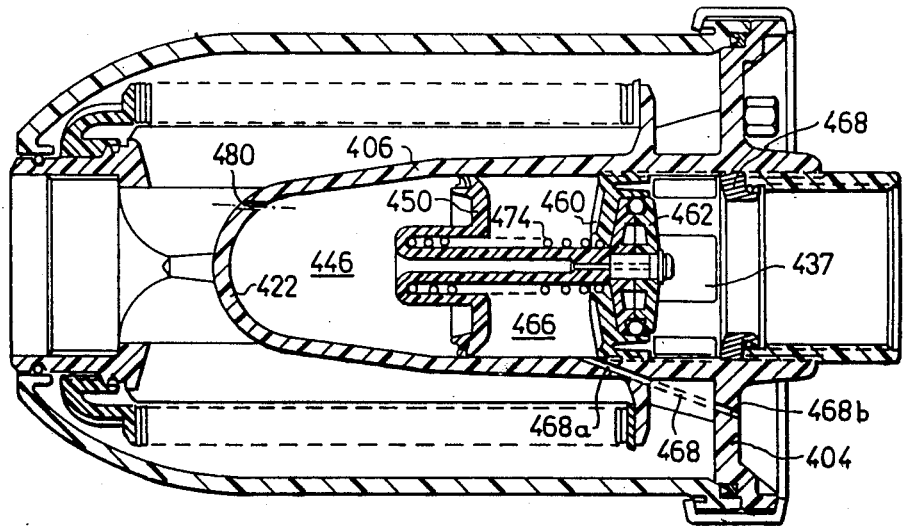

FIGS. 5–7 illustrate how the filter of FIG. 4, with the addition of a minimum of parts, can be converted to perform various additional functions. This is accomplished by exploiting the interior of the closed tubular member (106 in FIG. 4) to accommodate a valve member which is displaced with respect to the inlet openings (137 in FIG. 4) to control the flow of the fluid through these openings.

The filter illustrated in FIG. 5 is adapted for turning on or off the fluid flow through the filter under the control of a manual controller, generally designated 240. Controller 240 includes a lever 242 manually movable to a first position, as illustrated in FIG. 5, wherein it has one passageway 242a connected to the outlet tap 236 for tube 235 connected to the interior of the closed tubular member 206, and a second passageway 242b connected to tap 244 at the filter inlet port 220; thus, in the illustrated position of lever 242, the inlet pressure is applied to a chamber 246 within tubular member 206. Lever 242 is movable to a second position wherein its passageway 242a is connected to port 248 leading to the atmosphere, and its passageway 242b is connected to tap 236 leading to chamber 246, so that when the lever is in this second position, the interior of chamber 246 is vented to the atmosphere.

Chamber 246 is defined by the closed end 222 of the tapered portion 206b of tubular member 206, and a displaceable member or piston 250 movable within cylindrical portion 206a of tubular member 206, so that chamber 246 serves as a control chamber which is expansible and contractable according to the displacement of member 250. Displaceable member 250 carries, at the side thereof facing chamber 246, a stem 252 which is aligned with another short stem 254 fixed to the closed end wall 222 of tubular member 206. The two stems receive a light coil spring 256 tending to bias displaceable member 250 in the rightward direction, i.e. to expand chamber 246. The opposite side of displaceable member 250 carries a second stem 258 which passes through an apertured wall 260 secured, as by threading, to the interior of tubular member 206. Stem 258 carries a valve member 262 movable towards and away from an annular valve seat 264 at the upstream side of the inlet openings 237 formed through the wall of the tubular member 206. Valve member 262 is received within a cylindrical socket in wall 260 and is of smaller cross-sectional area than piston 250.

It will be seen that the space between piston 250 and wall 260 defines a second chamber 266 which is also expansible and contractable according to the displacement of piston 250. This second chamber 266 is vented to the atmosphere via a vent, generally designated 268, including an opening 268a through the wall of tubular member 206, and a second opening 268b through end wall 204.

The operation of the filter illustrated in FIG. 5 will be apparent from the above description:

Thus, when lever 242 of controller 240 is in the position illustrated in Fig. 5, the inlet pressure is applied via passageways 242b and 242a of the controller, and tap 236 to control chamber 246 within the closed tubular member 206. Since chamber 266 at the opposite side of piston 250 is vented to the atmosphere, this inlet pressured applied to piston 250 moves the piston rightwardly causing its valve member 262 to move across the inlet openings 237 and to seat against the annular valve seat 264, thereby interrupting the flow of the fluid from the inlet port 220 to the filter body 232.

However, when lever 242 of controller 240 is moved to the second position (not illustrated in FIG. 5), wherein its passageway 242a becomes aligned with the port communicating with control chamber 246 via tap 236, chamber 246 is vented to the atmosphere. Although control chamber 266 at the opposite side of piston 250 is also vented to the atmosphere, nevertheless, the inlet pressure applied to valve member 262 is sufficient to overcome the light spring 256 and to move the valve member to the illustrated open position with respect to the inlet openings 237, so that the fluid passing through the inlet port 220 can thus pass through the inlet openings 237 to the outer face of the filter body 232, then through the filter body 232, through the space 227 between the radial ribs 226, and out through the outlet port 224.

FIG. 6 illustrates the manner of adapting the filter for automatic shut-off when the pressure drop across the filter body therein designated 332, reaches a predetermined magnitude indicating that the filter is overly clogged with dirt particles.

Thus, the filter illustrated in FIG. 6 also includes the displaceable piston 350 dividing the interior of the closed tubular member 306 into a first expansible chamber 346, and a second expansible chamber 366 on opposite sides of the piston. Piston 350 is also connected by a stem 358 to the valve member 362 which is movable towards and away from the valve seat 364 in order to control the flow of the fluid through the inlet openings 337.

In the arrangement illustrated in FIG. 6, however, control chamber 346 is continuously connected to the inlet pressure by an axial bore 370 formed through stem 358. In addition, chamber 366 on the opposite side of piston 350 is continuously connected to the downstream side of a filter body 332 by a bore 372 through the tubular member 306 just inwardly of the apertured wall 360 secured within the tubular member. The filter illustrated in FIG. 3 further includes a coil spring 374 interposed between the fixed wall 360 and piston 350 biasing the piston leftwardly, i.e. to contract control chamber 346, and thereby to move valve member 362 away from its seat 368 to fully open the inlet openings 337.

It will be seen that the filter illustrated in FIG. 6 operates as follows:

While the filter body 332 is reasonably clean, there will be a small drop in pressure through the filter body, and therefore the inlet pressure within control chamber 346 will be substantially the same or only slightly greater than the outlet pressure within control chamber 366. Accordingly, spring 374 will move piston 350 to the illustrated position wherein valve member 362 fully opens the inlet passageways 337.

Now, as dirt accumulates on the outer face of the filter body 332, the pressure drop across the filter will increase, so that, while the inlet pressure within chamber 346 remains substantially the same, the outlet pressure within chamber 366 will drop. When it has dropped to a sufficient point indicating that the filter is overly clogged, the inlet pressure applied to piston 350 will move valve member 362 against the valve seat 368 to thereby terminate the flow of the fluid through the filter will thus be terminated, which condition will continue until the filter body is cleaned to thereby permit piston 350 to move to the position illustrated in FIG. 6.

FIG. 7 illustrates the manner of converting the filter to one for automatically regulating the fluid flow in response to the outlet pressure. For this purpose, the closed tubular member 406 is again provided with a displaceable piston 450, a fixed wall 460, and a valve member 462 coupled to the displaceable piston 350 by a stem 458, with a spring 474 biasing displaceable piston 450 in the direction attending to contract conttol chamber 446 and to expand control chamber 466 on the opposite side of the piston 450, which is the condition illustrated in FIG. 7. It will be seen that in this condition, valve member 462 is in its fully open position with respect to the inlet passageway 437.

In the arrangement illustrated in FIG. 7, however, control chamber 446 is connected to the downstream side of the filter body by means of an opening 480 formed through the end wall 422 of the closed tubular member 406, so that this chamber 446 is now subject to the outlet pressure of the filter. In addition, chamber 466 at the opposite side of piston 450 is connected to the atmosphere, as in the FIG. 5 embodiment, by an atmospheric vent generally designated 468, including an opening 468a formed through tubular member 206, and an opening 468b formed through end wall 404.

The filter illustrated in FIG. 7 thus operates as follows:

So long as the outlet pressure, which is present within control chamber 446, does not exceed a predetermined value, piston 450 and valve member 462 carried by it will be in the positions illustrated in FIG. 7, wherein the valve member 462 fully opens the inlet passageways 437.

However, should the outlet pressure rise above a predetermined value, this will increase the pressure within chamber 466 which is applied against piston 450, such that the piston moves against the force of spring 474 and the force applied by valve member 462, to move the latter valve member rightwardly and thereby to partially close the inlet passageways 437 until the outlet pressure drops. Thus, the arrangement illustrated in FIG. 7 automatically controls the inlet passageways 437 to regulate the filter outlet pressure.

While the invention has been described with respect to several preferred embodiments, it will be appreciated that these are shown for purposes of example only, and that many other variations, modifications, and applications of the invention may be made.

What is claimed is:

1. A fluid filter including a housing having means defining inlet and outlet ports and a cylindrical filter body extending longitudinally within said housing, characterized in that said housing includes an outer housing section of generally tubular configuration open at both its ends; an inner housing section including first and second longitudinally-extending tubular members and an end plate at one end of said first tubular member and securable to means defining a first open end of said outer housing section; and means on the outer face of said first and second tubular members for supporting said cylindrical filter body; both said end plate and said one end of said first tubular member being open and constituting one of said filter ports; the opposite end of said first tubular member being closed and terminating short of said outer housing section; said second tubular member being open at both ends, with one end longitudinally spaced from the closed end of said first tubular member, and the opposite open end received within the second open end of the outer housing section and constituting the other of said filter ports; means defining a first passageway through the wall of said first tubular member between its closed end and said end plate, establishing communication between said one filter port and the outer face of said filter body; and means defining a second passageway between said closed end of the first tubular member and the adjacent open end of the second tubular member for establishing communication between the outer face of said filter body and said second tubular member constituting the other of said filter ports.

2. The filter according to claim 1, further including a displaceable member within said first tubular member and defining with its closed end an expansible and contractable control chamber, and a valve member disposed within said first tubular member and coupled to said displaceable member to move therewith toward or away from said first passageway for controlling the flow of the fluid therethrough.

3. The filter according to claim 2, wherein said one filter port is the filter inlet port, and said other filter port is the filter outlet port.

4. The filter according to claim 3, further including first means establishing communication between said control chamber and said filter inlet port, and second means connected to a space defined between said displaceable member and said valve member for controlling the latter in response to the pressure in said control chamber.

5. The filter according to claim 4, wherein said second means vents to the atmosphere the space defined between said displaceable member and said valve member, said first means including a control valve which is movable to a first position establishing said communication between said filter inlet port and said control chamber and thereby to actuate said valve member to close said first passageway, or to a second position connecting said control chamber to the atmosphere, and thereby to actuate said valve member to open said first passageway.

6. The filter according to claim 5, wherein said valve member is of smaller cross-sectional area than said displaceable member, such that when said control valve is in its second position connecting the control chamber to the atmosphere, the inlet pressure applied to said valve member moves it to its open position with respect to said first passageway.

7. The filter according to claim 5, wherein said control valve is a manually-operated valve.

8. The filter according to claim 4, wherein said first means continuously establishes communication between said control chamber and said inlet port, the space defined between said displaceable member and said valve member being connected to the outlet side of said filter body such that the valve member automatically moves towards its closed position with respect to said first passageway upon the occurence of a predetermined pressure differential on the opposite side of said filter body indicating that the filter body is overly clogged with dirt particles.

9. The filter according to claim 3, further including first means establishing communication between said outlet port and said control chamber, and second means venting the space defined between said displaceable member and said valve member to the atmosphere, such that said valve member automatically moves towards and away from said first passageway to regulate the fluid flow therethrough in response to the pressure at said outlet port.

10. The filter according to claim 1, wherein said first passageway is defined by a plurality of openings formed through said first tubular member, slightly inwardly of said end wall and between same and said filter body.

11. The filter according to claim 1, wherein said second passageway is defined by a plurality of radially-extending ribs connecting the two tubular members together in spaced relationship.

12. The filter according to claim 11, wherein said two tubular members and said radially-extending ribs connecting them together are formed on their outer faces with a plurality of axially-extending ribs for supporting the cylindrical filter body.

13. The filter according to claim 12, wherein said cylindrical filter body includes a stack of filter discs.

14. The filter according to claim 13, wherein the outer end of said first tubular member is formed with an annular ring serving as an end stop for one end of the stack of filter discs, the outer end of the second tubular member being formed with threads for threadedly receiving another ring serving as an end stop for the opposite end of the stack of filter discs.

15. The filter according to claim 13, wherein said stack of filter discs includes a plurality of like discs of substantially the same uniform thickness and at least one further disc of non-uniform thickness such as to correct the accumulation of non-uniformities in the thicknesses of the like discs in the stack.

* * * * *